(12) United States Patent
Grain et al.

(10) Patent No.: US 9,187,075 B2
(45) Date of Patent: Nov. 17, 2015

(54) PROTECTION OF AN ALL-WHEEL CLUTCH OF A MOTOR VEHICLE HAVING A CLUTCH-CONTROLLED ALL-WHEEL DRIVE DURING A CRITICAL POWER BRAKING SITUATION INCLUDING A CLUTCH SLIP

(71) Applicant: Bayerische Motoren Werke Aktiengesellschaft, Munich (DE)

(72) Inventors: Christian Grain, Dachau (DE); Axel Wust, Wandlitz (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 14/036,149

(22) Filed: Sep. 25, 2013

(65) Prior Publication Data

US 2014/0024496 A1    Jan. 23, 2014

Related U.S. Application Data

(63) Continuation of application No. PCT/EP2012/054354, filed on Mar. 13, 2012.

(30) Foreign Application Priority Data

Mar. 25, 2011 (DE) .......................... 10 2011 006 166

(51) Int. Cl.
*B60W 10/02* (2006.01)
*B60W 10/06* (2006.01)
(Continued)

(52) U.S. Cl.
CPC ................ *B60W 10/02* (2013.01); *B60K 28/16* (2013.01); *B60W 10/06* (2013.01); *B60W 10/184* (2013.01);
(Continued)

(58) Field of Classification Search
CPC ... B60W 10/02; B60W 10/06; B60W 10/184; B60W 10/188; B60W 30/186
See application file for complete search history.

(56) References Cited

U.S. PATENT DOCUMENTS 6,125,315 A * 9/2000 Kon et al. ........................ 701/54
6,360,156 B1   3/2002 Morganroth et al.
(Continued)

FOREIGN PATENT DOCUMENTS

DE   10 2006 022 858 A1   11/2007
DE   11 2007 000 995 T5    5/2009
DE   10 2009 022 303 A1    3/2011

OTHER PUBLICATIONS

International Search Report (PCT/ISA/210) including English translation dated Jul. 16, 2012 (eight (8) pages).
(Continued)

*Primary Examiner* — Tisha Lewis
(74) *Attorney, Agent, or Firm* — Crowell & Moring LLP

(57) ABSTRACT

A method is provided for protecting an all-wheel drive clutch of a two-axle vehicle with clutch-controlled all-wheel drive. A power braking situation, where both the accelerator pedal and the brake are actuated and the vehicle is stationary or moves only slightly in the vehicle longitudinal direction, may be critical for the all-wheel drive clutch. For example, when the friction coefficient of the primary axle is very small and the wheel braking torque is less than the driving torque, a clutch slip may occur at the all-wheel drive clutch. Upon detecting a power braking situation, a protective measure is implemented against thermal overload of the all-wheel drive clutch, such as reducing or limiting the engine torque output, so that the clutch slip and the energy input into the all-wheel drive clutch are reduced.

9 Claims, 2 Drawing Sheets

(51) Int. Cl.
  *B60W 10/184* (2012.01)
  *B60W 10/188* (2012.01)
  *B60W 30/186* (2012.01)
  *F16D 48/06* (2006.01)
  *B60K 28/16* (2006.01)

(52) U.S. Cl.
  CPC ........... *B60W 10/188* (2013.01); *B60W 30/186* (2013.01); *F16D 48/06* (2013.01); *B60W 2520/10* (2013.01); *B60W 2520/26* (2013.01); *B60W 2540/10* (2013.01); *B60W 2540/12* (2013.01); *F16D 2500/10431* (2013.01); *F16D 2500/30405* (2013.01); *F16D 2500/30406* (2013.01); *F16D 2500/3111* (2013.01); *F16D 2500/3118* (2013.01); *F16D 2500/31413* (2013.01); *F16D 2500/31426* (2013.01); *F16D 2500/5106* (2013.01); *Y10T 477/743* (2015.01)

(56) References Cited

U.S. PATENT DOCUMENTS

| | | | | |
|---|---|---|---|---|
| 7,909,732 | B2* | 3/2011 | Sigmund | 477/107 |
| 8,202,199 | B2* | 6/2012 | Katakura et al. | 477/171 |
| 8,311,717 | B2* | 11/2012 | Eberhard et al. | 701/68 |
| 2006/0025895 | A1* | 2/2006 | Jansson | 701/1 |
| 2007/0112499 | A1 | 5/2007 | Matsuno et al. | |
| 2009/0143195 | A1* | 6/2009 | Katakura et al. | 477/120 |
| 2009/0258754 | A1 | 10/2009 | Uddin | |
| 2009/0318265 | A1 | 12/2009 | Ginther | |
| 2010/0130328 | A1 | 5/2010 | Eberhard et al. | |
| 2010/0285923 | A1* | 11/2010 | Sigmund | 477/203 |

OTHER PUBLICATIONS

German Search report including English translation dated Oct. 20, 2011 (ten (10) pages).

* cited by examiner

PROTECTION OF AN ALL-WHEEL CLUTCH OF A MOTOR VEHICLE HAVING A CLUTCH-CONTROLLED ALL-WHEEL DRIVE DURING A CRITICAL POWER BRAKING SITUATION INCLUDING A CLUTCH SLIP

CROSS REFERENCE TO RELATED APPLICATIONS

This application is a continuation of PCT International Application No. PCT/EP2012/054354, filed Mar. 13, 2012, which claims priority under 35 U.S.C. §119 from German Patent Application No. DE 10 2011 006 166.5, filed Mar. 25, 2011, the entire disclosures of which are expressly incorporated by reference herein.

BACKGROUND AND SUMMARY OF THE INVENTION

The invention relates to a method for protecting an all-wheel drive clutch of a motor vehicle with a clutch-controlled all-wheel drive and a control unit, in particular, an engine control unit or a control unit for vehicle dynamics control, with a corresponding protection function.

In a clutch-controlled all-wheel drive of a motor vehicle one axle of the vehicle is typically permanently driven, while the other axle is optionally supplied with drive power by means of a controllable all-wheel drive clutch. The driven axle is referred to as the primary axle; and the axle, which can be optionally engaged, is referred to as the secondary axle. In a clutch controlled all-wheel drive the all-wheel drive clutch is actuated preferably by electronic means. In this case a clutch torque of the all-wheel drive clutch is adjusted so that it simultaneously corresponds to the maximum possible torque that can be transmitted by the clutch in the direction of the secondary axle.

The clutch torque and, thus, also the torque of the secondary axle are limited to a maximum clutch torque of the all-wheel drive clutch, where this maximum clutch torque depends on the specific configuration of the all-wheel drive clutch. If there is a deviation between the secondary axle-sided rotational speed and the primary axle-sided rotational speed at the all-wheel drive clutch, then one speaks of clutch slip. Such a clutch slip causes a thermal energy input into the all-wheel drive clutch, so that, depending on the magnitude of the clutch slip and the duration of the thermal stress, this thermal energy input can even lead to the thermal destruction of the all-wheel drive clutch.

It is known from the German patent publication no. DE 11 2007 000 995 T5 to compare the actual clutch slip with a permissible clutch slip in a motor vehicle with all-wheel drive and then to send, as required, a signal to the engine controller, as a function of the comparison, in order to reduce the engine torque.

The U.S. Pat. No. 6,360,156 B1 describes a method for determining the differential speed between the front wheels and the rear wheels of a vehicle with an all-wheel drive and an all-wheel drive clutch. A permissible torque is determined, as a function of the differential speed; and if this permissible torque is exceeded, then the torque is reduced to a value that is not greater than the admissible torque.

A critical clutch slip may occur especially in a power braking situation, in which the primary axle exhibits a low coefficient of friction. A power braking situation means, within the context of the patent application, a situation, in which both the accelerator pedal and the brake are actuated (this is typically possible only in a vehicle with an automatic transmission) and the vehicle is stationary or moves only slightly in the longitudinal direction of the vehicle.

In a power braking situation, in which the primary axle exhibits a low coefficient of friction, the driving torque at the primary axle is typically greater than the sum of the primary axle-sided braking torque of both wheels and the wheel spin torque, so that the wheels of the primary axle spin, while the wheels of the secondary axle stand still or almost still, because the wheels of the secondary axle are locked. In a power braking situation, in which the primary axle exhibits a low coefficient of friction, the braking torque of the primary axle is often not sufficient to support (i.e., to compensate for) the high driving torque, so that the primary axle begins to spin (the effective torque on the primary axle is greater than that of the wheel spin torque of the primary axle). However, the secondary axle can fully support the torque, which can be transmitted through the all-wheel drive clutch, by the brakes of the secondary axle (since the torque, which can be transmitted to the secondary axle, is smaller), so that the wheels of the secondary axle stand still. This situation may cause the all-wheel drive clutch to slip and may also produce a high input of thermal energy without the vehicle driving off. This may result, depending on the thermal capacity of the built-in clutch, in overheating of the all-wheel drive clutch within a short period of time. To avoid a thermal destruction of the all-wheel drive system in such a case, the all-wheel drive clutch is disengaged for its protection. However, the result of such a solution is the temporary loss of the additional drive via the secondary axle.

Therefore, the object of the present invention is to provide a method, which is intended to protect an all-wheel drive clutch and which prevents a large input of energy into the all-wheel drive clutch in a critical power braking situation, when one wheel of the primary axle spins or both wheels of the primary axle spin (in particular, because the coefficient of friction of the primary axle is small), and, as a result, a clutch slip occurs. Furthermore, the object of the present invention is to provide a control unit with a corresponding protection function.

One aspect of the invention focuses on a method for protecting an all-wheel drive clutch, for example, a friction clutch (in particular, a multi-disk friction clutch), of a two-axle motor vehicle with a clutch-controlled all-wheel drive. In the all-wheel drive a primary axle is typically permanently driven; and a secondary axle can be selectively driven by means of the controllable all-wheel drive clutch. However, it is not absolutely mandatory that the primary axle be permanently driven; rather it can also be provided that the primary axle be selectively driven by means of an additional clutch.

According to the method, a power braking situation, which is critical for the all-wheel drive clutch and in which a clutch slip occurs, is detected in the all-wheel drive clutch. As explained above, both the accelerator pedal and the brake are actuated in a power braking situation. In this case the vehicle is stationary or moves only slightly in the longitudinal direction of the vehicle (for example, at a speed that is less than a threshold value, for example, less than 4 m/s). Moreover, in a critical power braking situation with clutch slip at least one of the wheels of the primary axle spins (for example, because the coefficient of friction of the primary axle is very small, for example, in the case of a primary axle on ice or wet ground) and a clutch slip occurs at the all-wheel drive clutch (because the wheels of the secondary axle are held by the brakes or barely move, while the wheels of the primary axle are spinning). Upon detection of a power braking situation, which is critical for the all-wheel drive clutch and in which a clutch slip occurs, a protective measure against a thermal overload of the all-wheel drive clutch is implemented. For example, according to an advantageous embodiment of the method, the engine torque is reduced or limited, so that the clutch slip and, thus, also the energy input into the all-wheel drive clutch are reduced. As an alternative, it may be provided that the braking torque for the at least one spinning wheel of the primary axle is increased, so that the spinning is reduced and, in so doing, the clutch slip is also reduced. It goes without saying that both the engine torque can be reduced or limited, and the braking torque can be increased.

Preferably a power braking situation, which is critical for the all-wheel drive clutch and in which a clutch slip occurs, is detected by evaluating both an accelerator pedal signal, which is characteristic for the accelerator pedal position (for example, a driving torque requested by the driver) and by evaluating a brake signal, which is characteristic for actuating the brake (for example, a braking torque requested by the driver). This approach makes it possible to check whether both the accelerator pedal and also the brake are actuated, for example, by comparing the two signals with a respective threshold value. In addition, the critical power braking situation is detected by evaluating a slip signal, which is characteristic for the clutch slip of the all-wheel drive clutch, for example, by evaluating the differential rotational speed in the all-wheel drive clutch (for example, by comparing the signal with a threshold value). Preferably a signal, which is characteristic for the vehicle speed, is also evaluated: for example, a vehicle speed signal and a rotational speed signal of a wheel of the secondary axle. For example, it is checked whether the vehicle speed in terms of its absolute value is smaller than a threshold value (for example, less than 2.5 m/s).

According to a preferred exemplary embodiment, it is also checked, in order to detect a power braking situation that is critical for the all-wheel drive clutch, whether the conditions for a critical thermal energy input into the all-wheel drive clutch are met, in particular, whether the thermal stress on the all-wheel drive clutch is increasing in a critical manner. Such a measure makes sense against the background that the clutch slip can occur in certain driving situations (for example, cornering or ABS braking), but the thermal energy input is too low and, therefore, there is no need to initiate any countermeasures. For example, it can be checked, whether the increase (i.e., the gradient) of a signal, which is characteristic for the thermal stress on the all-wheel drive clutch (for example, a temperature value), is greater than or equal to or greater than a certain threshold value.

It is advantageous to determine an engine torque, at which the wheels of the primary axle do not spin, and to reduce or limit the engine torque to this determined engine torque. As an alternative, of course, it could also be provided that the engine torque be reduced or limited to an engine torque having a smaller value than the determined engine torque. In particular, if the wheels of the primary axle are no longer spinning, then the clutch slip decreases (because the differential rotational speed between the primary axle and the secondary axle decreases); and, in so doing, the energy input into the all-wheel drive clutch decreases.

In order to determine the engine torque, at which the wheels of the primary axle do not spin, it is possible to determine, for example, the braking torque for one or both axles. As an alternative, a braking torque is estimated in terms of its absolute value downwards. For example, the braking torque can be calculated at one or both axles by means of the current brake pressure. For example, the braking torque of the secondary axle can be estimated in terms of its absolute value downwards by the clutch torque, because the all-wheel drive clutch can transmit no more torque than the clutch torque to the secondary axle. Then, when the vehicle is in stationary mode, the braking torque is greater in terms of its absolute value than the clutch torque.

It is advantageous if the method is applied to the vehicle, in which the rear axle corresponds to the primary axle, and the front axle corresponds to the secondary axle. Typically brakes with a higher maximum brake pressure are installed at the front axle rather than at the rear axle, so that when power braking, the brake pressure at the rear axle is insufficient, and the wheels of the rear axle have the tendency to spin. Thus, the method is extremely advantageous in such an all-wheel drive concept. As an alternative, the method can also naturally be applied to a vehicle, in which the rear axle corresponds to the secondary axle, and the front axle corresponds to the primary axle.

A second aspect of the invention focuses on a control unit having a function for protecting an all-wheel drive clutch of a two-axle motor vehicle with a clutch-controlled all-wheel drive. In this case the control unit may be, for example, an engine control unit or a brake control unit, in particular, a control unit for the vehicle dynamics control. The control unit comprises means for detecting a power braking situation that is critical for the all-wheel drive clutch and in which a clutch slip occurs, in the all-wheel drive clutch. Furthermore, means are provided for implementing or initiating a protective measure against a thermal overload of the all-wheel drive clutch, for example, means for reducing or limiting the engine torque and/or for increasing the braking torque for the at least one spinning wheel of the primary axle. The means are implemented, for example, in the software that is run on a processor of the control unit.

The above statements about the inventive method according to the first aspect of the invention also apply in an analogous manner to the inventive control unit according to the second aspect of the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
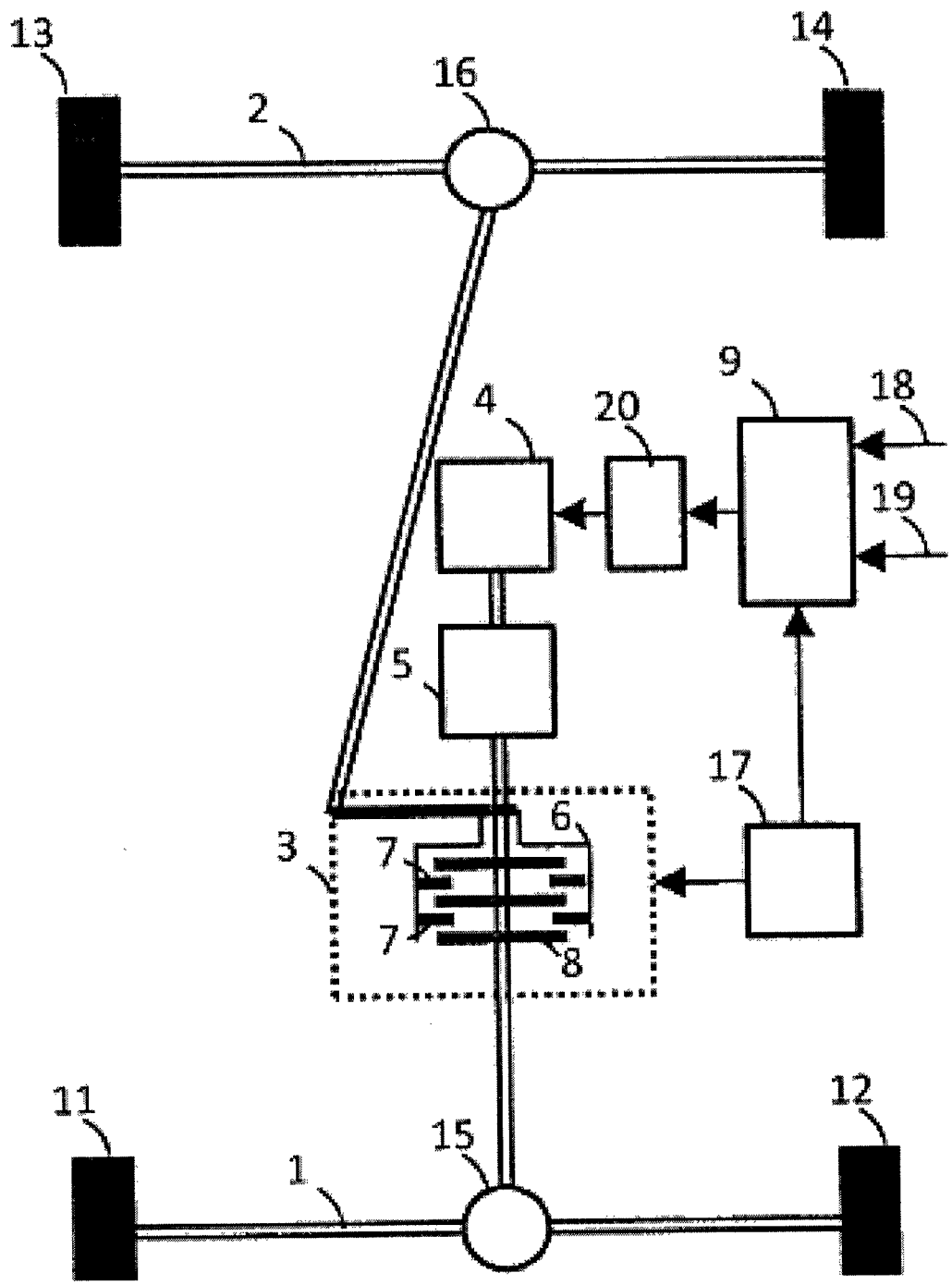
FIG. 1 is a schematic illustration of a motor vehicle with a clutch-controlled all-wheel drive in accordance with an embodiment of the present invention, wherein the rear axle is permanently driven as a primary axle, and the front axle can be selectively driven as a secondary axle by the controllable all-wheel drive clutch.

FIG. 1 shows in schematic form a motor vehicle with a clutch-controlled all-wheel drive, wherein the rear axle 1 with the wheels 11, 12 is permanently driven as the primary axle; and the front axle 2 with the wheels 13, 14 is selectively driven as the secondary axle by means of a controllable all-wheel drive clutch 3. The vehicle is preferably a vehicle with a front engine drive, wherein a cardan shaft is provided between the automatic transmission 5 and the axle drive 15. The method, which is presented below and which is designed to protect the all-wheel drive clutch, can also be transferred to a vehicle with the rear axle as the secondary axle and with the front axle as the primary axle. In this case then the rear axle and the front axle have to be exchanged.

The drive comprises an engine 4, which is controlled by an engine control unit 20, and the automatic transmission 5, which is connected to the engine 4. The controllable all-wheel drive clutch 3, in this case in the form of a multi-disk clutch, may be found on the side of the transmission output. The all-wheel drive clutch 3 is controlled by a clutch control unit 17. In the all-wheel drive clutch the clutch input is through-connected in the direction of the rear axle 1, so that the rear axle 1 is permanently driven. Between the all-wheel drive clutch 3 and the rear axle 1 there is a cardan shaft and an axle drive 15. The front axle 2 is driven as a secondary axle only when the clutch 3 is closed. In the case of a multi-disk clutch the disks 7, which are externally toothed on the cage 6, and the disks 8, which are internally toothed on the hub, are pressed together. Owing to the friction, the clutch cage 6 and the clutch hub are connected to each other. The clutch cage 6 is connected to the secondary sided output of the clutch 3, so that in the closed state of the clutch 3, a portion of the torque on the transmission output side is transmitted via the axle drive 16 to the wheels 13, 14 of the front axle 2.

In order to close the clutch 3, a specific value is set for the clutch torque of the all-wheel drive clutch; and this value corresponds to the maximum possible torque that can be transmitted by the clutch 3 in the direction of the front axle. This means that the torque that can be transmitted to the front axle 2 is limited upwards by the set clutch torque.

In the exemplary embodiment shown in FIG. 1, a protection function for protecting the all-wheel drive clutch is accommodated in a control unit for the vehicle dynamics control. As an alternative, the protection function could also be implemented, for example, in the engine control unit 20.

The vehicle, shown in FIG. 1, has a protection function for protecting the all-wheel drive clutch 3. This protection function prevents the thermal destruction of the all-wheel drive clutch 3 when power braking the vehicle (i.e., simultaneous actuation of the accelerator pedal and the brake pedal) with a low coefficient of friction at the rear axle 1 and when the wheels 11, 12 of the rear axle 1 are spinning Especially in this situation the braking torque of the rear axle is insufficient to support the very high driving torque, so that the rear axle starts to spin (i.e., the driving torque of the rear axle 1 that remains after deduction of the braking torque is greater than the low wheel spin torque for the rear axle 1 due to the low coefficient of friction). However, the front axle 2 can fully support the torque transmitted to the secondary axle 2 by way of the all-wheel drive clutch 3; the front wheels stand still. This is because of the fact that the torque that can be transmitted to the front axle 2 is less than the torque that can be transmitted to the rear axle 1 due to the limited torque transmission capacity of the all-wheel drive clutch 3, the maximum braking torque at the front axle 2 is typically greater than the maximum braking torque at the rear axle 1, and the maximum braking torque of the front axle 2 is typically greater than the maximum transmittable clutch torque.

In addition, there may also exist a μ jump situation, where the coefficient of friction of the wheels 13, 14 of the front axle 2 is greater than the coefficient of friction of the wheels 11, 12 of the rear axle 1, for example, if the rear axle 1 is above a surface of ice or snow or above wet ground, and the front axle is not on a surface covered with ice, snow or moisture. In this case the wheel spin torque of the front axle 2 is greater than the wheel spin torque of the rear axle 1. The conditions for a typical μ jump maneuver are met, for example, when pulling a boat trailer out of the water and the front axle is standing on dry asphalt, and the rear axle is standing above wet or even muddy ground having a lower coefficient of friction. In principle, however, a low coefficient of friction can also be present at the front axle.

The spinning of the wheels 11, 12 of the rear axle allows the all-wheel drive clutch 3 to slip and leads to a high thermal energy input without the vehicle driving off directly.

Figure 2:
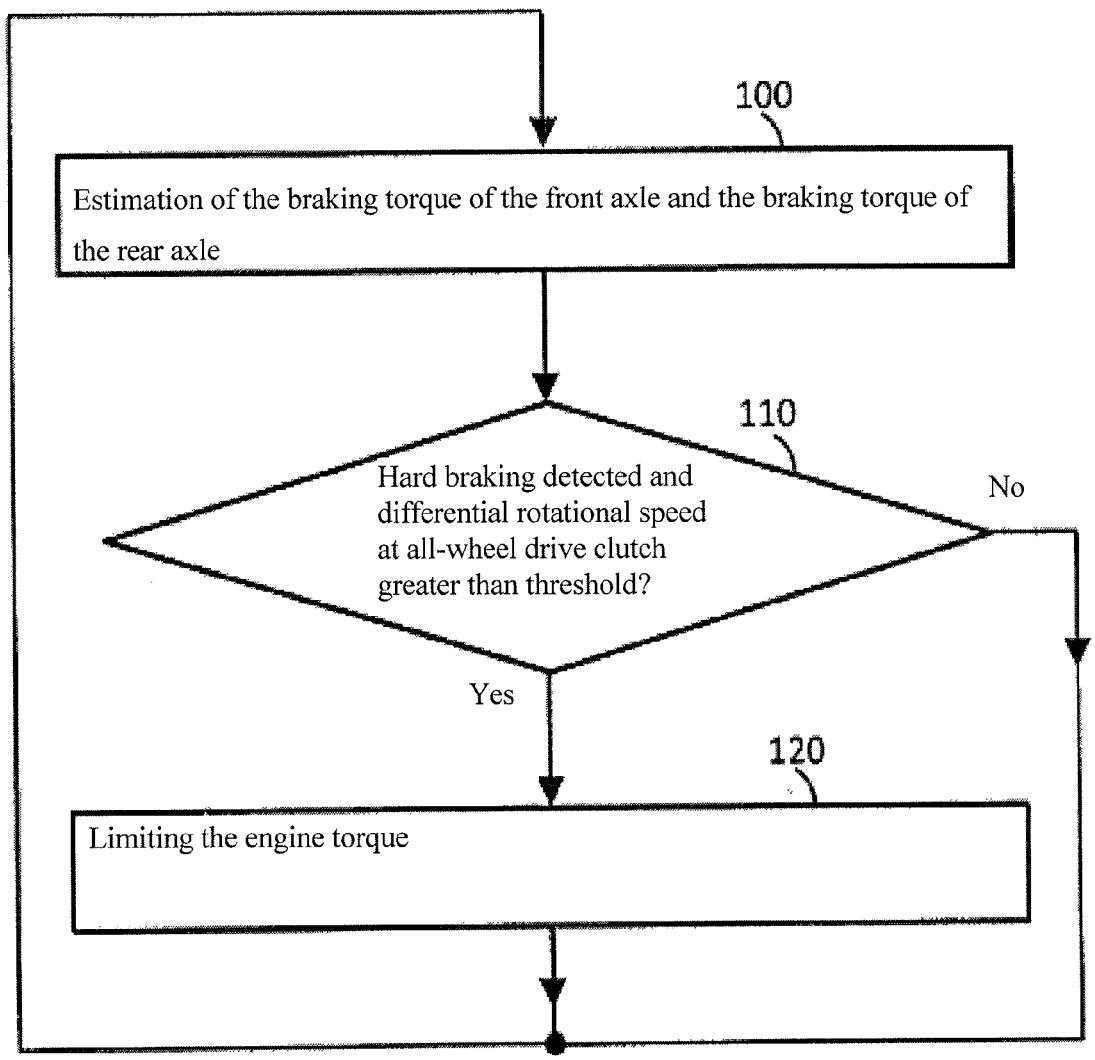
FIG. 2 is a logic diagram of an embodiment of a protection function in accordance with an embodiment of the present invention which is implemented in a control unit and is designed to protect the all-wheel drive clutch against a thermal overload.

In order to prevent the high thermal energy input with the risk of damaging the all-wheel drive clutch 3, the protection function, which is shown in FIG. 2, is implemented in the control unit 9, which initiates a limiting of the engine torque, as required. The control unit 9 communicates the limit to the engine control unit 20. The limiting of the engine torque typically translates into a reduction in the engine torque. This approach prevents the clutch from being opened, so that the all-wheel drive clutch 3 is protected. In this case such a disengagement of the clutch would result in the loss of the front axle drive. Some of the information that is used to carry out the function, such as the degree of thermal stress on the all-wheel drive clutch 3 and the differential rotational speed of the all-wheel drive clutch, is transmitted from the clutch control unit 17 to the control unit 9, in particular via a data bus. Furthermore, the control unit 9 receives the accelerator pedal information 18 and the brake information 19.

In step 100 the protection function estimates the braking torque at the front axle 2 and the braking torque at the rear axle 1. The sum of the estimated braking torque of the front axle 2 (wherein the clutch torque is used to estimate the braking torque of the front axle 2) and the braking torque of the rear axle 1 corresponds to a driving torque, which can be supported by the brakes.

To this end, in step 100 the current brake pressure $BD_{li}$ of the left wheel 11 and the brake pressure $BD_{re}$ of the right wheel 12 and the braking boost $P_{iBREMSE,HA}$ of a wheel of the rear axle 1 are used to calculate the braking torque of the rear axle 1 $M_{BREMS\_HA}$ as the sum of the braking torques of the wheels 11, 12 with respect to the cardan shaft (i.e., the primary sided output of the clutch 3):

$$MBrems\_HA = (BD_{li} \cdot P_{iBremese,HA} + BD_{re} \cdot P_{iBremse,HA})/i_{AG}$$

In this case the variable $i_{AG}$ describes the transmission ratio of the axle drive 15.

The braking torque of the front axle 2 can be calculated in an analogous manner. As an alternative, however, it can also be provided that the braking torque $M_{BREMS\_VA}$ of the front axle 2 (relative to the cardan shaft) be estimated downwards by means of the clutch torque $M_{Kupp}$ of the all-wheel drive clutch 3 (in the case of clutch slip). The clutch torque $M_{Kupp}$ represents, in particular, the maximum of the torque that can be transmitted to the front axle. In the case of clutch slip this clutch torque $M_{Kupp}$ is transmitted approximately to the front axle. When the vehicle is not moving, the actual braking torque $M_{BREMS\_VA}$ at the front axle 2 is at least as large as the clutch torque $M_{Kupp}$; otherwise the vehicle would move.

In step 110 it is checked whether there is a power braking situation, which is critical for the all-wheel drive clutch, with a differential rotational speed in the all-wheel drive clutch larger than a differential rotational speed limit. Such a critical situation is detected here, when the following conditions are fulfilled cumulatively:
1. A signal indicating the accelerator pedal position (for example, a signal between 0% and 100%, wherein 100% corresponds to a fully depressed pedal position) is greater than a threshold value, for example, greater than 50%.

2. A signal indicating the braking torque requested by the driver or a signal indicating the residual brake pressure is greater than a threshold value.
3. The vehicle speed in the longitudinal direction is smaller than a predetermined speed limit, for example less than 2.5 m/s.
4. The differential rotational speed of the all-wheel drive clutch 3 is greater than a setpoint differential rotational speed limit.
5. There is a correspondingly high thermal energy input.

The detection of the thermal energy input (see 5) is implemented, for example, by evaluating a thermal clutch stress signal, which indicates the thermal stress of the all-wheel drive clutch 3. For example, it is checked whether the thermal stress on the all-wheel drive clutch 3 is increasing in a critical manner.

To this end, the gradient of the degree of thermal stress (thermal stress) is calculated as the difference between the clutch stress signal at the current time $t=t_0$ and the clutch stress signal at an earlier time $t=t_1$:

$$\Delta \text{Stress}=\text{Stress}\,(t=t_0)-\text{Stress}\,(t=t_1)$$

For example, the clutch stress signal is a signal that corresponds to a percentage value between 0% and 100%.

For example, a corresponding energy input is detected if the gradient $\Delta$Stress is greater than or equal to a certain gradient threshold. In addition, it can be provided that one or more additional conditions must also be fulfilled in order to detect an energy input.

If a critical power braking situation with a differential rotational speed in the all-wheel drive clutch has been detected in step 110 (for example, because the rear axle has such a low coefficient of friction that one or both rear wheels are spinning, and a correspondingly high differential rotational speed with a high energy input occurs), then the engine torque is limited upwards in step 120 (this limit is communicated to the engine control unit 20 by the control unit 9). The limiting of the engine torque translates into a reduction in the engine torque, if the engine torque were to be above the limit without limiting. As an alternative or in addition to the limiting of and/or reduction in the engine torque, the braking torque could also be increased. For this purpose the engine torque is limited and/or reduced to a supportable engine torque, at which the wheels of the primary axle do not spin. The engine torque is limited preferably to the braking torque (determined in step 100) of the front and rear axle plus the friction torque $M_{Reib,HA}$ at the rear axle (where the variable i describes the total transmission ratio between the cardan shaft and the crank shaft):

$$M_{Mot}=(M_{Kupp}+M_{Bremss\_HA}+M_{Reib,HA})/i$$

The calculated engine torque $M_{Mot}$ is communicated to the engine control unit 9 and is used to control the engine as an upper limit for the engine torque.

Following completion of the conditions for power braking, the engine torque is released again during a subsequent run through of step 110.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for protecting an all-wheel drive clutch of a motor vehicle having two axles with a clutch-controlled all-wheel drive and an automatic transmission, wherein a primary axle is driven and a secondary axle is selectively drivable by the all-wheel drive clutch; said method comprising the acts of:

detecting a power braking situation in which a clutch slip of the all-wheel drive clutch exceeds or is expected to exceed a predetermined critical amount of clutch slip; and implementing a protective measure against a thermal overload of the all-wheel drive clutch upon detecting a power braking situation, wherein the detecting the power braking situation includes determining whether there exist vehicle operating conditions in which
both an accelerator pedal and a brake pedal are actuated,
the vehicle is essentially stationary in a vehicle longitudinal direction while the brake pedal is actuated and brakes of the secondary axle is applied to inhibit secondary axle wheel motion,
at least one of a plurality of wheels of the primary axle spins, and
a clutch slip occurs at the all-wheel drive clutch, and wherein the implementing the protective measure includes
determining an engine torque output based on a non-predetermined braking torque at which the plurality of primary axle wheels do not spin; and
reducing or limiting the engine torque output to or below the determined engine torque output at which the plurality of primary axle wheels do not spin.

2. The method as claimed in claim 1, wherein the act of implementing the protective measure includes said reducing or limiting the engine torque output and/or an increasing a braking torque for the at least one spinning wheel of the primary axle.

3. The method as claimed in claim 2, wherein the act of detecting the power braking situation includes
evaluating an accelerator pedal signal indicative of an accelerator pedal position,
evaluating a brake signal indicative of actuation of the brake pedal, and
evaluating a slip signal indicative of the clutch slip of the all-wheel drive clutch.

4. The method as claimed in claim 3, wherein the act of detecting the power braking situation further includes evaluating a signal indicative of a vehicle speed.

5. The method as claimed in claim 3, wherein the act of detecting the power braking situation further includes determining whether a thermal stress on the all-wheel drive clutch is increasing in a manner which exceeds a predetermined critical thermal energy input.

6. The method as claimed in claim 1, wherein the determining the engine torque includes determining or estimating a braking torque for one or both of the two axles.

7. The method as claimed in claim 1, wherein a front axle of the two axles corresponds to the secondary axle, and a rear axle of the two axles corresponds to the primary axle.

8. The method as claimed in claim 1, wherein the all-wheel drive clutch is a multi-disk friction clutch.

9. A control unit configured to protect an all-wheel drive clutch of a motor vehicle having two axles with a clutch-controlled all-wheel drive and an automatic transmission, wherein a primary axle is driven and a secondary axle is selectively drivable by the all-wheel drive clutch; said control unit comprising:

means for detecting a power braking situation in which a clutch slip of the all-wheel drive clutch exceeds or is expected to exceed a predetermined critical amount of clutch slip; and means for implementing a protective measure against a thermal overload of the all-wheel drive clutch upon detecting a power braking situation, wherein the means for the detecting the power braking situation determines whether there exist vehicle operating conditions in which
- both an accelerator pedal and a brake pedal are actuated,
- the vehicle is essentially stationary in a vehicle longitudinal direction while the brake pedal is actuated and at least one brake of the secondary axle is applied to inhibit secondary axle wheel motion,
- at least one of a plurality of wheels of the primary axle spins, and
- a clutch slip occurs at the all-wheel drive clutch, and wherein the means implementing the protective measure
- determines a non-predetermined engine torque output at which the plurality of primary axle wheels do not spin, and
- reduces or limits the engine torque output to or below the determined engine torque output at which the plurality of primary axle wheels do not spin.

* * * * *